United States Patent
Tsugai et al.

[11] Patent Number: 6,125,700
[45] Date of Patent: Oct. 3, 2000

[54] VIBRATING TYPE ANGULAR VELOCITY SENSOR

[75] Inventors: Masahiro Tsugai; Nobuaki Konno; Yoshiaki Hirata, all of Tokyo, Japan

[73] Assignee: Mitsubishi Denki Kabushiki Kaisha, Tokyo, Japan

[21] Appl. No.: 09/000,648

[22] Filed: Dec. 30, 1997

[30] Foreign Application Priority Data

Jun. 13, 1997 [JP] Japan ..................................... 9-156672

[51] Int. Cl.$^7$ ....................................................... G01P 9/04
[52] U.S. Cl. ..................................... 73/504.12; 73/504.14
[58] Field of Search ........................... 73/504.02, 504.04, 73/504.08, 504.09, 504.12, 504.14, 504.15, 514.32, 504.16

[56] References Cited

U.S. PATENT DOCUMENTS

| | | | |
|---|---|---|---|
| 5,488,863 | 2/1996 | Mochida et al. ..................... | 73/504.16 |
| 5,604,312 | 2/1997 | Lutz ..................................... | 73/504.14 |
| 5,889,207 | 3/1999 | Lutz ..................................... | 73/504.13 |
| 5,895,851 | 4/1999 | Kano et al. .......................... | 73/504.04 |
| 5,945,599 | 8/1999 | Jujiyoshi et al. .................... | 73/504.12 |
| 5,945,600 | 8/1999 | Touge et al. ......................... | 73/504.14 |

FOREIGN PATENT DOCUMENTS

| | | |
|---|---|---|
| 694 01 607 T2 | 9/1992 | Germany. |
| 195 30 007 A1 | 2/1997 | Germany. |
| 196 54 304 A1 | 7/1997 | Germany. |
| 7-239339 | 9/1995 | Japan. |

OTHER PUBLICATIONS

"Micromechanical Tuning Folk Gyroscope Test Results" written by M. Weiberg et al., AIAA–94–3687–CP.

*Primary Examiner*—Helen C. Kwok
*Attorney, Agent, or Firm*—Sughrue, Mion, Zinn, Macpeak & Seas, PLLC

[57] ABSTRACT

A vibrating type angular velocity sensor is comprised of: a driving vibrator element 8 supported by a first beam 9 fixed by an anchor portion 3 on a substrate, and driven by a driving comb electrode 12 along an X-axial direction parallel to the substrate; a detecting vibrator element 10 supported by a second beam 11 on the driving vibrator element and being vibratable along a Y-axial direction; and detection electrodes 14 and 15 of an electric capacitance provided with separated from the detecting vibrator element, and the detection electrodes along the X-axial direction, whereby an angular velocity while setting a Z-axial direction perpendicular to the substrate as an axis is detected. Furthermore, the driving vibrator element is fixed on the substrate by way of two sets of the anchor portions arranged at positions symmetrical to each other with respect to the detecting vibrator element. Also, one of the detection electrodes is arranged on the detecting vibrator element, and the other of the detection electrodes is arranged on the driving vibrator element with separated from each other by an equi-interval space.

3 Claims, 7 Drawing Sheets

VIBRATING TYPE ANGULAR VELOCITY SENSOR

BACKGROUND OF THE INVENTION

The present invention is related to a vibrating type angular velocity sensor utilizing characteristics of a gyroscope.

Currently, great attention is paid to sensors capable of detecting angular velocities of moving objects, in particular, sensors manufactured by using semiconductor micromachining techniques. These sensors own merits, e.g., compact devices, mass productivities, high precision, and high reliability.

FIGS. 6A and 6B schematically represent a typical vibrating type gyroscope manufactured with employment of the micromachining processing for the semiconductor device as described in, for instance, the publication entitled "MICRO-MECHANICAL TUNING FORK GYROSCOPE TEST RESULTS" written by M. Weiberg et al., AIAA-94-3687-CP. FIG. 6A is a plan view, and FIG. 6B is a cross-sectional view, taken along a line B—B shown in FIG. 6A. Two vibrator elements 2 are supported via an anchor portion 3 by a beam 4 on a substrate 1. A displacement detection electrode 7 is formed on a glass or silicon on the substrate 1 under these vibrator elements 2. Both the vibrator elements 2 and the displacement detection electrode 7 will constitute a capacitor C1 and a capacitor C2 as represented in FIG. 7.

The right/left vibrator elements are excited along an X-axial (inner plane direction) direction by applying a DC voltage and an AC voltage to a driving comb electrode 5. A so-called "tuning fork drive" is employed so as to realize reversal phases whose phases are different from each other by 180 degrees at a resonant point in a vibration system. A drive-displacement detecting fixed electrode 6 is positioned opposite to the respective vibrator elements 2 in order to monitor vibrations of these vibrator elements 2 to be driven.

On the other hand, when an angular velocity "Ω" around a Y axis is exerted on the right/left vibrator elements 2 which are excited in the reversal phases along ±X directions (substrate inner plane direction), each of these vibrator elements 2 receives inertial force (namely, Coriolis force) along a Z-axial (substrate outer plane) direction, and this inertial force is directly proportional to mass "m", a velocity "v", and an angular velocity "Ω" of the vibrator element 2. In response to this inertial force, twist vibrations are induced around the Z axis as a center. In response to Z-directional displacement of the vibrator elements caused by the twist vibrations, a capacitance value between one vibrator element 2 and the displacement detection electrode 7 is increased (C1+ΔC1), whereas a capacitance value between the other vibrator element 2 and the displacement detection electrode 7 is decreased (C2−ΔC2). A change in the capacitance values is converted into a voltage by a C-V converter, and this voltage is sync-detected by using the effect frequency of the Coriolis force, so that it is possible to produce such a sensor output proportional to the angular velocity "Ω".

In the above-described conventional system, in order that the vibration amplitudes of the vibrator elements 2 are increased and furthermore the displacement sensitivities along the detections are improved, large characteristic values "Q" of vibrations are required even in the vibrations along any directions. For example, the above-mentioned prior art gyroscope reports that the characteristic value Q in the excitation direction is 40,000 and the characteristic value Q in the detection direction is 5,000 under pressure of 100 mTorr. In particular, along the detection displacement direction, since the opposite area between the vibrator elements 2 and the lower electrode 7 is large and the gap (space) between them is small (on the order of several micrometers), the characteristic value Q becomes small along the drive direction due to so-called "squeeze damping".

On the other hand, since the characteristic value Q is lowered under atmospheric pressure, such high voltages as DC 30 V and AC 30 V are required in order to obtain the drive displacement having the similar degree.

As described above, in the prior art system, the sensor element is necessarily required by way of the vacuum sealing (encapsulation) so as to lower the drive voltages and increase the detection displacement sensitivities. As a result, air-tight vacuum packaging is required. To secure the reliability thereof, there is such a drawback that the metal packages are required, namely higher cost.

Even when the sensor is used under atmospheric pressure, the high drive voltages are required. Since this sensor owns such a structure that the Z-axial direction is employed as the detection vibration direction, as previously explained, there is another problem that the characteristic value Q along the detection direction is small, as compared with the characteristic value Q along the excitation direction. A further problem is such that sufficiently high detection sensitivities could not be achieved by only increasing the drive voltages.

Furthermore, generally speaking, in a vibrating type gyroscope, a resonant point of drive vibrations must be slightly shifted from a resonant point of detection vibrations in order to maintain a frequency characteristic of this vibrating type gyroscope. A resonant frequency of displacement vibrations along the Z-axial direction depends upon a thickness of this structure, so that precise thickness controls should be required. In the case that a sensor element is manufactured by using the lithography in the semiconductor field, although better patterning precision within the plane can be achieved, the control along the thickness direction (etching control and the like) becomes difficult. There is another problem that it is practically difficult to properly set the resonant frequencies of both members.

SUMMARY OF THE INVENTION

The present invention has been made to solve the above-explained problems of the conventional angular velocity sensors, and therefore, has an object to improve a detection displacement sensitivity of an angular velocity sensor.

A vibrating type angular velocity sensor, according to a first aspect of the present invention, is featured by comprising: a driving vibrator element supported by a first beam fixed by an anchor portion on a substrate, and driven by a driving comb electrode along an X-axial direction parallel to the substrate; a detecting vibrator element supported by a second beam on the driving vibrator element and being vibratable along a Y-axial direction; and detection electrodes of an electric capacitance provided with separated from the detecting vibrator element, and the detection electrodes along the X-axial direction, whereby an angular velocity while setting a Z-axial direction perpendicular to the substrate as an axis is detected.

A vibrating type angular velocity sensor, according to a second aspect of the present invention, is featured by that in addition to the first aspect, the driving vibrator element is fixed on the substrate by way of two sets of the anchor portions arranged at positions symmetrical to each other with respect to the detecting vibrator element.

A vibrating type angular velocity sensor, according to a third aspect of the present invention, is featured by that in addition to the first aspect, one of the detection electrodes is arranged on the detecting vibrator element, and the other of the detection electrodes is arranged on the driving vibrator element with separated from each other by an equi-interval space.

BRIEF DESCRIPTION OF THE DRAWINGS

FIG. 6A is a plan view, and FIG. 6B is a sectional view, taken along the line B—B of FIG. 6A.

DETAILED DESCRIPTION OF THE PREFERRED EMBODIMENTS (Embodiment 1)

Figure 1:
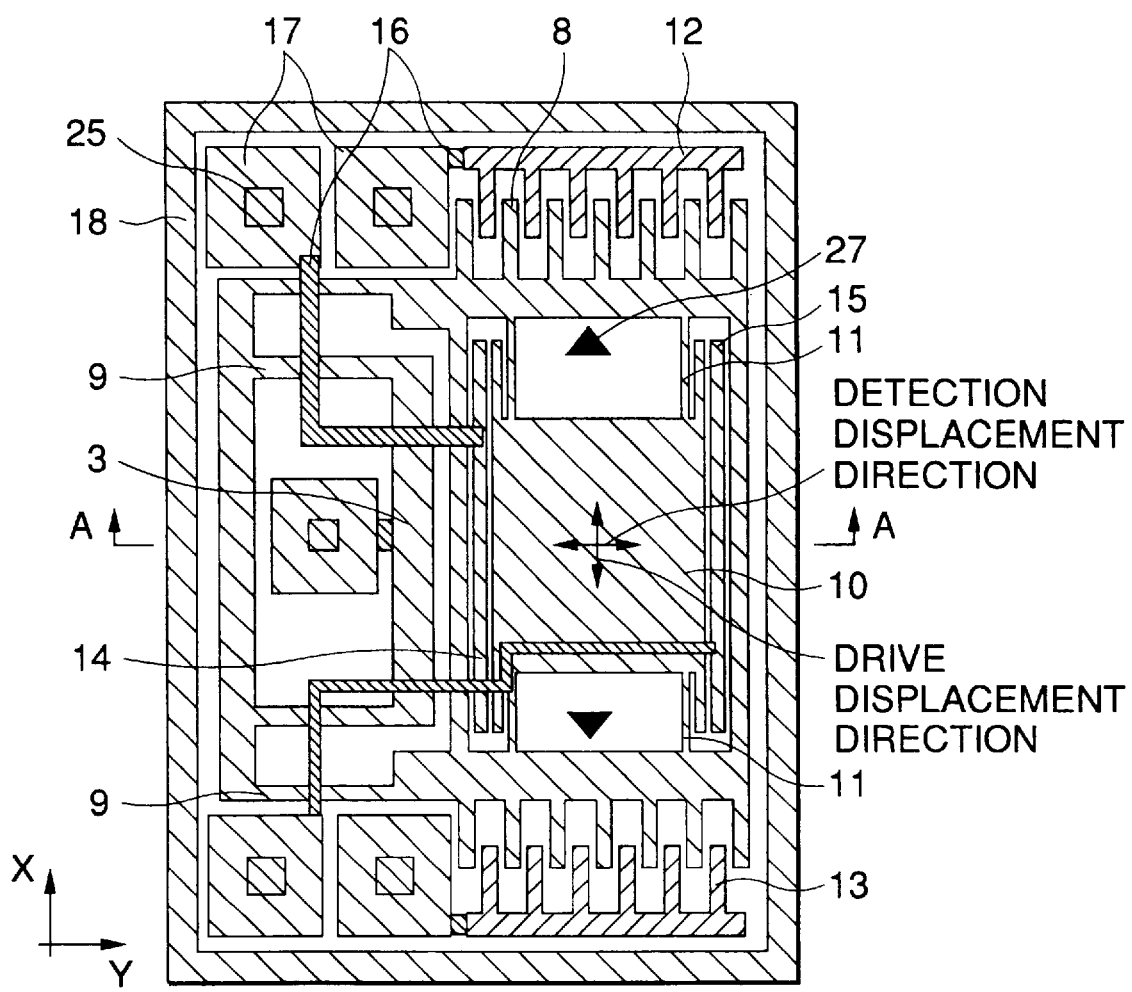
FIG. 1 is a plan view for indicating a structure of a vibrating type angular velocity sensor according to an embodiment 1 of the present invention.
Figure 2:
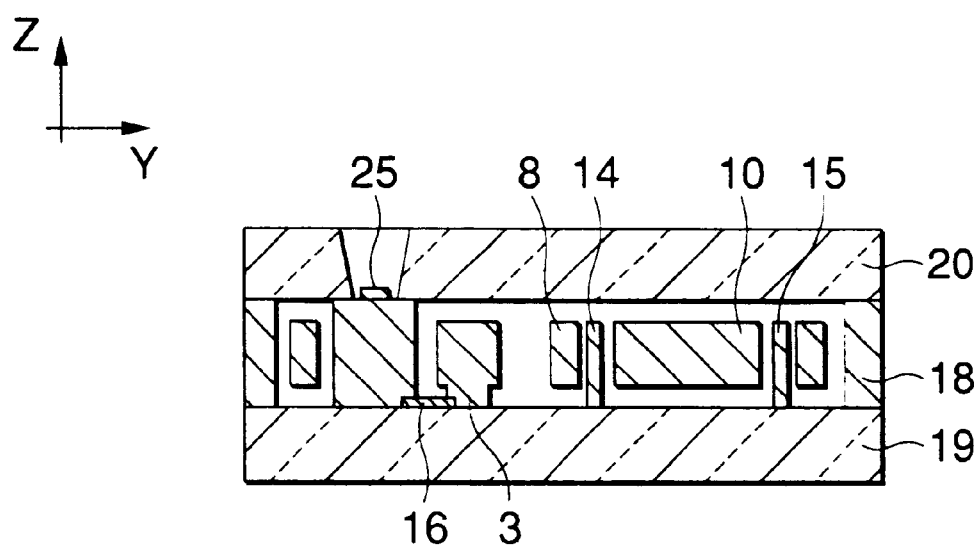
FIG. 2 is a sectional view, taken along a line A—A of FIG. 1.

FIGS. 1 and 2 show a vibrating type angular velocity sensor according to an embodiment 1 of the present invention. FIG. 1 is a plan view of this sensor, and FIG. 2 is a sectional view, taken along a line A—A of FIG. 1.

Figure 7:
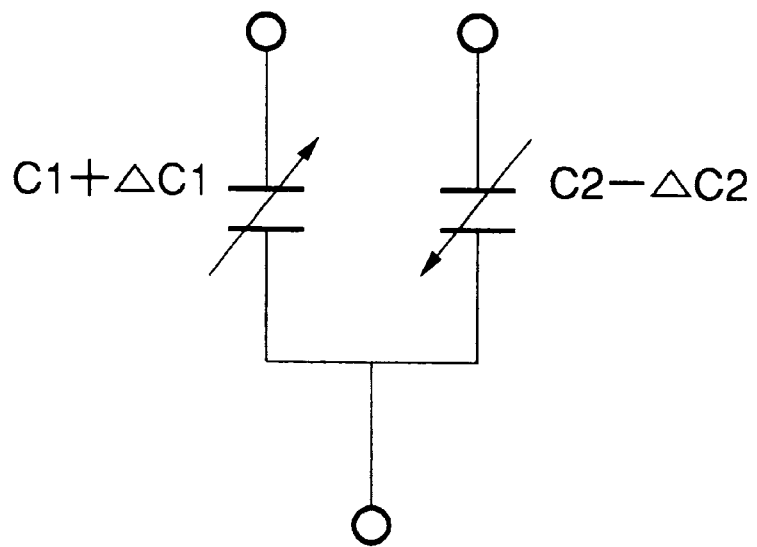
FIG. 7 is a diagram for indicating the equivalent circuit of the detection side in the conventional vibrating type angular velocity sensor.

A driving vibrator element 8 is supported by a beam 9 used for the driving vibrator element (folded beam) corresponding to a first beam, and is fixed via an anchor portion 3 on a lower glass substrate 19. Inside the driving vibrator element 8, a detection vibrator element 10 for detecting Y-direction Coriolis force is supported by 4 sets of beams 11 used for the detection vibrator element, corresponding to a second beam. Both a driving comb fixed electrode 12 and a drive-displacement detecting fixed electrode 13 are formed, while being positioned opposite to a side surface where the driving vibrator element 8 is provided, and further comb electrode structures are also formed on the driving vibrator element 8 in such a manner that these comb electrode structures are located opposite to the combs of these electrodes 12 and 13. On the other hand, detection electrodes 14 and 15 of electric capacitances are formed with being separated from each other by a gap of several micrometers on both sides of the detecting vibrator element 10, so that a capacitor C1 and a capacitor C2 are formed between the detecting vibrator element 10 and these detection electrodes 14, 15. Thus, an equivalent circuit shown in FIG. 7 is formed by these capacitors C1 and C2. The respective electrodes and the anchor portion 3 are coupled to a base 17 for deriving the respective electrodes by way of a wiring electrode 16 provided on a lower glass substrate 19. A bonding pad 25 is formed on the base 17 for deriving these electrodes. A large displacement preventing stopper 27 is provided between the driving vibrator element 8 and the detecting vibrator element 10 in order to avoid excessive displacement along the X-axial direction, caused when drop and shock happen to occur. Also, to restrict large displacement produced along the positive direction of the X-axial direction and the negative direction thereof, this large displacement preventing stopper 27 is arranged between the driving vibrator element 8 and the detecting vibrator element 10 in such a manner that the large displacement preventing stoppers are located on both sides of the detecting vibrator element 10 while keeping a gap space of such a displacement amount that these stoppers are wanted to be limited on the side of the driving vibrator element 8.

Also, an auxiliary supporting portion 18 is provided in such a manner that the respective components such as the driving vibrator element 8 and the detecting vibrator element 10 are surrounded by this auxiliary supporting portion 18.

Preferably, these vibrator elements 8, 10, the base 17 for deriving the electrodes, the stopper 27, and the respective electrodes 12 to 16 are manufactured by way of bulk micromachining by using Si (silicon) of a semiconductor material. As represented in the sectional view of FIG. 2, the vibrator elements 8 and 10 are anode-jointed to the lower glass substrate 19 only at the anchor portion 3, whereas other parts are anode-jointed to the lower glass substrate 19 in such a way that either entire surfaces thereof or one portions thereof are faced to the lower glass substrate 19.

When the driving vibrator element 8 is excited to be driven along the X direction with employment of the above-described structure, the angular velocity while setting the Z direction as an axis can be detected by the vibrations of the detecting vibrator element 10 along the Y direction.

It should be noted that in FIG. 1, the asymmetrical cantilever structure has been employed (beam 9 and anchor portion 3 are provided only on left side of detecting vibrator element 10) in which the driving vibrator element 8 is supported via the beam 9 for this driving vibrator element by one portion of the anchor portion 3. Alternatively, it is also possible to a two-point supporting structure in which the same symmetrical structure as that of the left-sided detecting vibrator element 10 may be provided on a right-sided detecting vibrator element 10, and a similar beam as well as a similar anchor portion may be provided.

The two-point supporting structure for setting this detecting vibrator element 10 as a symmetrical center has such a merit that the drive vibration direction with respect to the detecting vibrator element 10 can be correctly set only to the X direction. As a consequence, the detecting vibrator element 10 can be driven with having a large amplitude, so that the detecting sensitivity can be improved.

Also, the detection electrodes 14 and 15 are arranged on the right/left sides of the detecting vibrator element 10 with keeping the gap of several micrometers, respectively. On the other hand, these detection electrodes 14 and 15 are arranged with having the same value, as to the gap with respect to the driving vibrator element 8.

This is because even when the vibration direction of the detecting vibrator element 10 caused by the drive is not made purely coincident with the X direction, unwanted capacitance changes are not produced in the detection electrodes 14 and 15. Since the detection electrodes 14 and 15 are sandwiched by the driving vibrator element 8 and the detecting vibrator element 10 in the equi-interval, when both the vibrator elements are vibrated in an integral manner, a summation of the electric capacitances defined on both sides of these detection electrodes 14 and 15 is not changed. As a consequence, the electric capacitances of the detection electrodes 14 and 15 may constitute index for detecting only the vibrations of the detecting vibrator element 10 along the Y direction.

Next, a manufacturing method will be explained. FIGS. 3A to 3E illustrate an example of a manufacturing method according to this embodiment in a manufacturing stage order. FIGS. 3A through 3E show views corresponding to sectional views taken along the line A—A of FIG. 1.

Figure 3A:
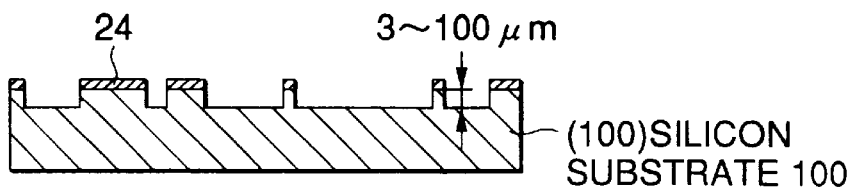
FIGS. 3A to 3E are sectional view for representing a manufacturing process step of the vibrating type angular velocity sensor according to the embodiment 1 of the present invention.
Figure 3B:
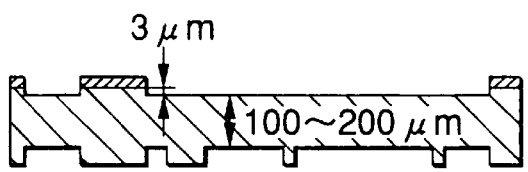
Figure 3C:
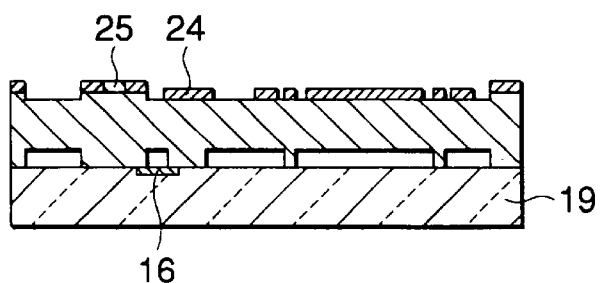
Figure 3D:
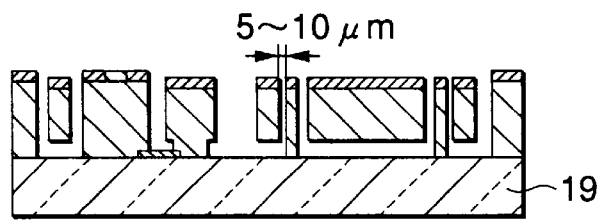
Figure 3E:
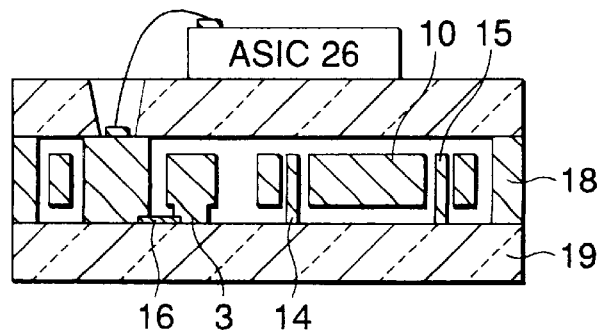

First, as indicated in FIG. 3A, (100) Si substrate 100 is used, and a groove having a depth of 3 to 100 μm is formed by way of the dry etching process while using either resist or an insulating film 24 as a mask. Thereafter, as indicated in FIG. 3B, a wafer 100 is turned over. Similarly, a surface of this turned wafer 100 is dry-etched away on the order of 3 μm, while using either the resist or the insulating film 24 as a mask. On the other hand, a metal electrode 16 (for instance (Cr/Au) is formed on a glass substrate 19 by utilizing the sputtering method and the lift-off method. After the mask of the wafer 100 fabricated at the manufacturing step (b) is removed, and the wafer 100 is aligned with the glass substrate 19 having the electrode wiring line 16, an anode joint is carried out. Thereafter, a bonding pad 25 is formed. Subsequently, the plane structure of FIG. 1 is patterned by employing either the resist or the insulating film 24 (see FIG. 3C). Next, while employing either this resist or the insulating film 24, the penetrate dry etching process of the silicon wafer is carried out (see FIG. 3D). At this stage, a basic structure of the sensor is determined. At a stage shown in FIG. 3E, the upper glass substrate 20 is aligned to be anode-jointed, a detecting circuit ASIC 26 is die-bonded, and this is wire-bonded with the bonding pad 25. With employment of the above-described process, the sensor can be accomplished.

As previously described, according to this embodiment 1, since any of the driving vibration direction and the detecting vibration direction is located within the X-Y plane, the adverse influences caused by the manufacturing errors in the patterning process and the etching process are made common; so that the resonant frequencies of the driving operation and the detecting operation can be determined in higher precision and also in higher yield.

Also, since the vibration beam 9 for the driving operation and the vibration beam 11 for the detecting operation are independently provided from each other, there is such a feature that the mechanical couplings between the driving operation and the detecting operation can be suppressed, as compared with such a case that the same beam is used for both the driving vibration and the detecting vibration.

Also, it is possible to manufacture such a structural body having a high aspect ratio (a value of h/w with respect to 1 is large, "h" being defined by a thickness of a beam along a Z direction, and "w" being defined by a width of a beam) by the bulk micromachining method with utilizing the deep dry etching process. Accordingly, since stiffness or rigidity of the structural body along the Z direction is made larger than that along the inner face direction, the dimension of the inner face of the vibrating element can be increased. In connection therewith, a total number of the comb electrodes capable of generating the driving electrostatic force can be increased (total number of comb electrodes is simply, directly proportional to driving displacement). As apparent from the foregoing description, since the structural body can be made such that the amplification function of the driving displacement and a total number of the comb electrodes can be increased, the driving displacement can be increased even when the characteristic value Q of vibrations is small under atmospheric pressure. Thus, it is possible to provide a vibrating type angular velocity sensor with a high sensitivity.

Also, since the internal sensor structure can be hermetically sealed during the steps of this process by a three-layer structure of glass-Si-glass manufactured by this process, no metal package is newly required.

(Embodiment 2)

Figure 4:
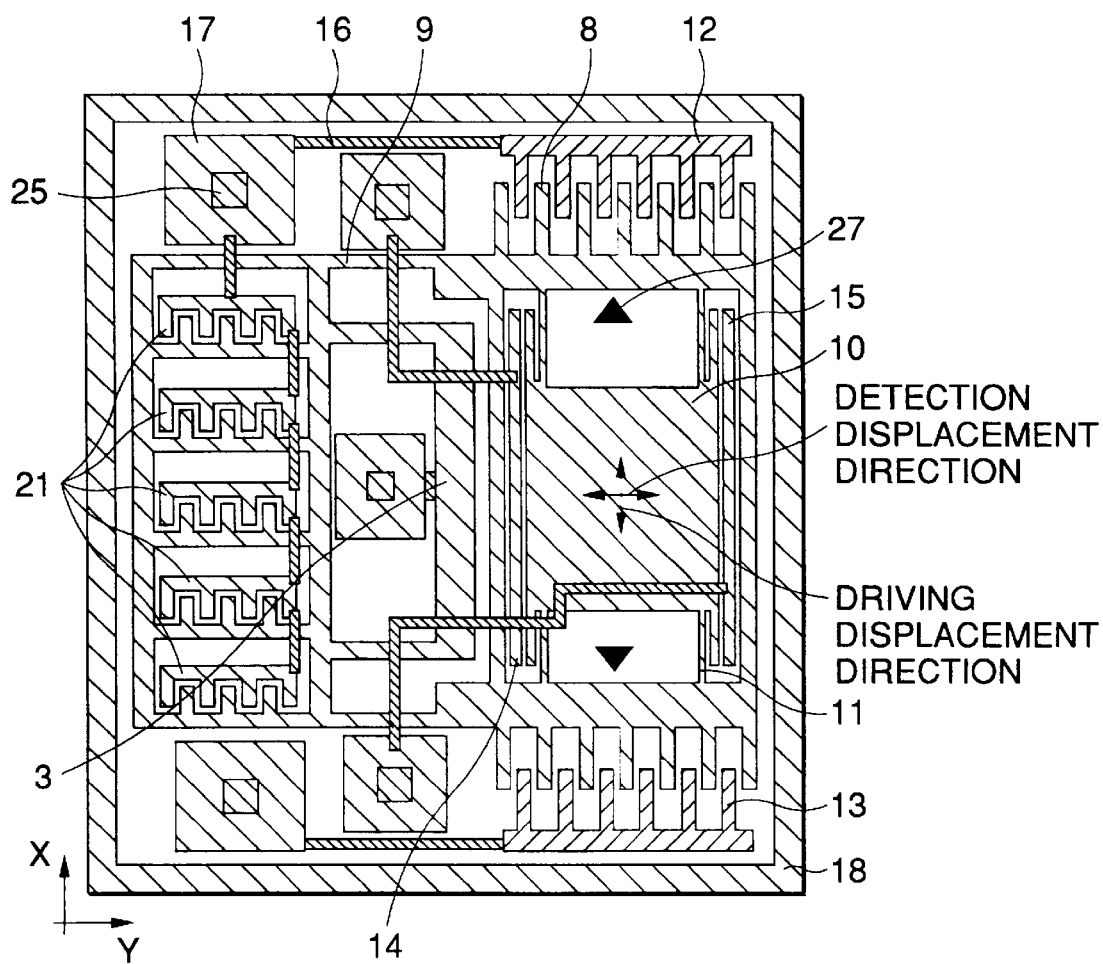
FIG. 4 is a plan view for indicating a structure of a vibrating type angular velocity sensor according to an embodiment 2 of the present invention.

In FIG. 4, there is shown a structure of a vibrating type angular velocity sensor according to an embodiment 2 of the present invention. In accordance with this embodiment 2, in order to amplify a displacement amount at a resonant point of driving vibrations of a vibrator element, another vibrator element is newly provided which is coupled to the first-mentioned vibrator element with respect to a vibrator element of a 1-free degree system. Also, mechanisms for producing driving forces are employed in these vibrator elements. Thus, a 2-free degree vibration system is constituted in which these mechanisms are coupled by beams having proper shapes/dimensions. Although the basic structure of the embodiment 1 and the basic structure of the embodiment 2 are made in common with each other, the driving vibration producing mechanism is further formed on the left side of the beam 9 for the driving vibrator element, so that the driving force, eventually the driving displacement amount can be increased. This sensor structure can be made in such a manner that the driving displacement is increased by the first and second driving comb fixed electrodes 12 and 21. As a result, since the driving displacement amount can be increased, the displacement sensitivity of the vibrator element 10 for detecting Coriolis force can be increased, and the vibrating type angular velocity sensor with the high sensitivity can be provided.

It should be understood that this embodiment 2 represents such a structure that the driving attraction force is produced only along the positive direction of the X-axial direction by the second driving comb fixed electrode 21. Alternatively, another structure effected along the negative direction, or a further structure with a fixed function may be employed.

Also, as previously described in the embodiment 1, it is possible to employ such a 2-point supporting structure that another structure symmetrical with the right-sided detecting vibrator element 10 is employed.

(Embodiment 3)

Figure 5:
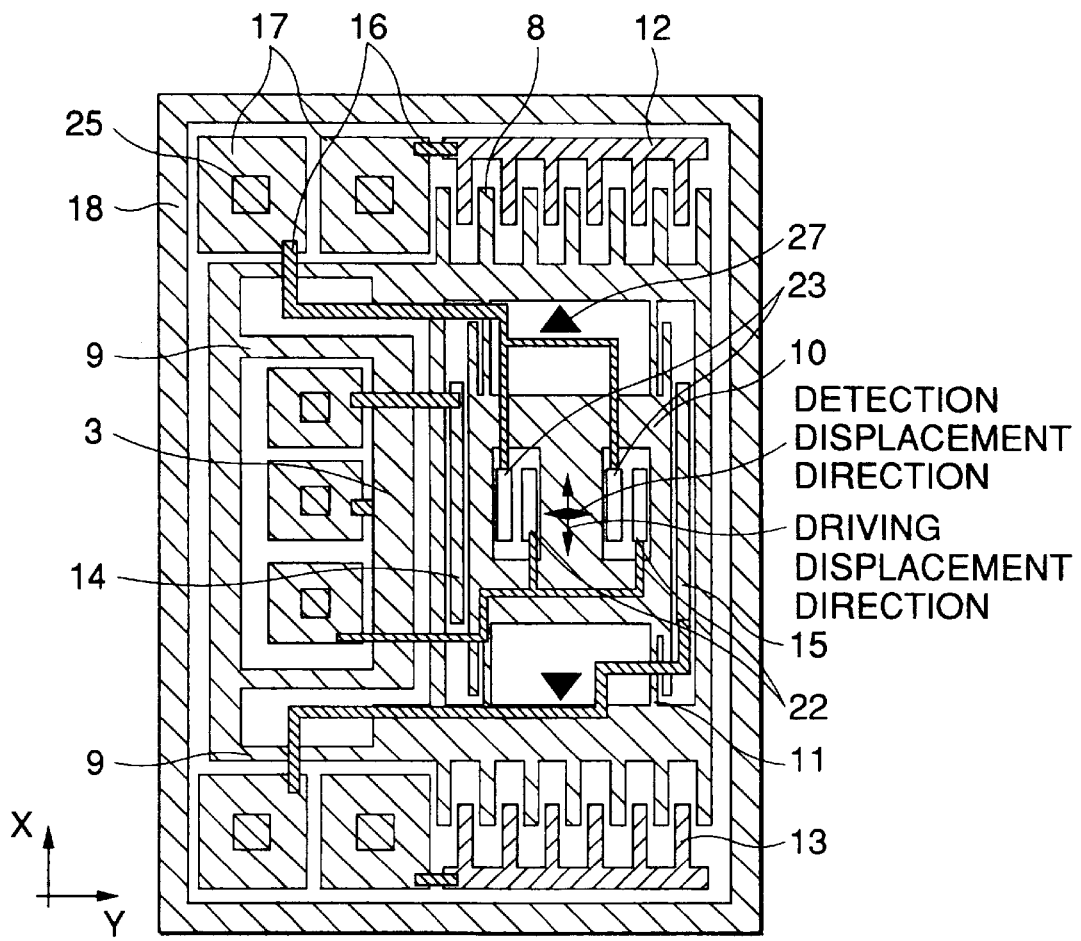
FIG. 5 is a plan view for indicating a structure of a vibrating type angular velocity sensor according to an embodiment 3 of the present invention.
Figure 6A:
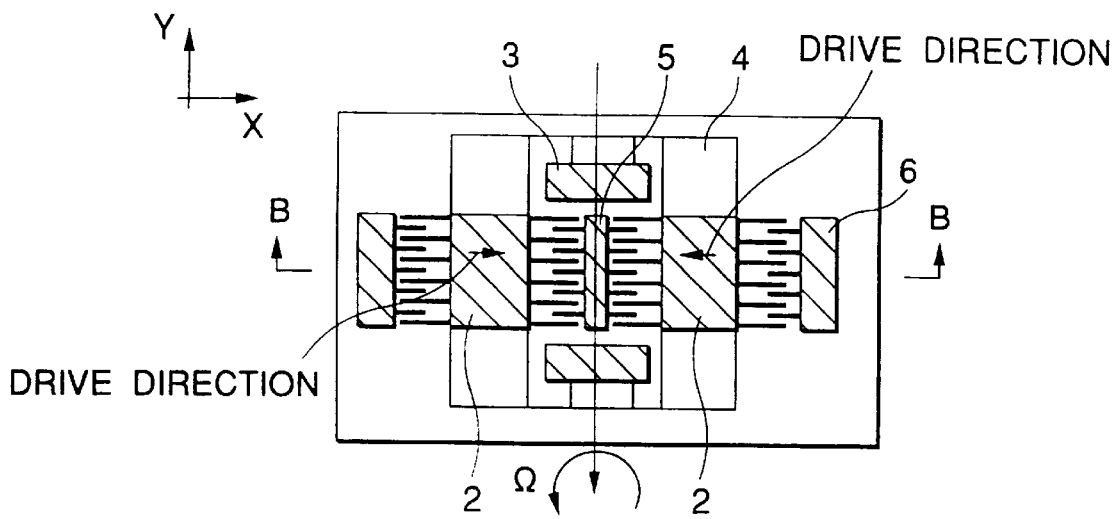
FIGS. 6A and 6B are explanatory diagrams for explaining one example of the structure of the conventional vibrating type angular velocity sensor.
Figure 6B:
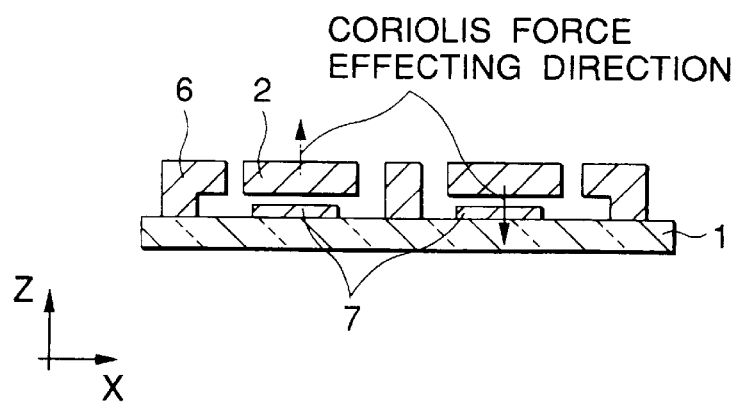

FIG. 5 represents a structure of a vibrating type angular velocity sensor according to an embodiment 3 of the present invention. A basic structure of this embodiment 3 is commonly made with that of the embodiment 1. An internal portion of the detecting vibrator element 10 may be hollowed out, and then, as indicated in this drawing, a certain number of second detection electrodes 22, 23 may be newly formed in this hollow in such a manner that these second detection electrodes are arranged in a symmetrical manner along upper/lower directions, while setting the X-axial direction of the detecting vibrator 10 as a center.

It should also be noted that in order to increase the initial capacitance value of the detection electrode and the variation amount thereof, the second detection electrode 22 may be electrically connected to the first detection electrode 14, and the second detection electrode 23 may be electrically connected to the first detection electrode 15.

Also, the second detection electrodes 22 and 23 may be utilized as electrostatic force generating feedback electrodes for generating the electrostatic forces capable of canceling the Y-axial direction displacement produced by the Coriolis force.

Also, as previously described in the embodiment 1, it is possible to employ such a 2-point supporting structure that another structure symmetrical with the right-sided detecting vibrator element 10 is employed.

Furthermore, a certain number of the newly employed second detection electrodes 22 and 23 may be utilized as self-actuation electrodes (namely, driving operation to detection vibrator element 10 for checking purpose). For instance, both the detection vibrator element 10 and this detection electrode may produce the electrostatic force by which a check is made as to whether or not the sensor can be firmly deviated along the detection direction when this sensor is initiated.

As previously described, in accordance with the first aspect of the present invention, the vibrating type angular velocity sensor is comprised of: the driving vibrator element supported by the first beam fixed by the anchor portion on the substrate, and driven by the driving comb electrode along the X-axial direction parallel to the substrate; the detecting vibrator element supported by the second beam on the driving vibrator element and being vibratable along the Y-axial direction; and detection electrodes of the electric capacitance provided with having the space between the detecting vibrator element, and the detection electrodes along the X-axial direction, whereby the angular velocity while setting the Z-axial direction perpendicular to the substrate as the axis is detected. Then, the angular velocity is detected while setting the Z-axial direction perpendicular to the substrate as the axis. As a result, the driving displacement is increased, the Coriolis force produced by the angular velocity is increased, so that the sensitivity can be improved. As a consequence, the higher characteristic value Q for the vibrations is not required, but also the sensor is no longer required to be sealed under vacuum pressure, which is conventionally required. Since the sensor can be made by using a simple hermetic package, the cost thereof can be reduced.

Also, in accordance with the second aspect of the present invention, in addition to the first aspect, the driving vibrator element is fixed on the substrate by way of two sets of the anchor portions arranged at the positions symmetrical to each other with respect to the detecting vibrator element. Therefore, the driving vibration direction for the detecting vibrator element can be correctly directed only to the X direction. As a result, the sensor can be driven with having the large amplitude, and the detection sensitivity can be improved.

Furthermore, in accordance with the third aspect of the present invention, in addition to the first aspect, one of these detection electrodes is arranged on the detecting vibrator element, and the other of the detection electrodes is arranged on the driving vibrator element with separated from each other by the equi-interval space. Even when the vibration direction of the driven detecting vibrator is not purely made coincident with the X direction, no unwanted capacitance change can be produced in the detection electrodes. It is possible to provide such a vibrating type angular velocity sensor capable of detecting only the displacement caused by the Coriolis force, which having insensitivities to the driving displacement.

What is claimed is:

1. A vibrating type angular velocity sensor comprising:
   a driving vibrator element supported by a first beam fixed by an anchor portion on a substrate, and driven by a driving comb electrode along an X-axial direction parallel to said substrate;
   a detecting vibrator element supported by a second beam on said driving vibrator element, and being vibratable along a Y-axial direction perpendicular to the X-axial direction and parallel to said substrate; and
   detection electrodes of an electric capacitance separated from said detecting vibrator element, and said detection electrodes disposed along the X-axial direction, so that an angular velocity while setting a Z-axial direction perpendicular to said substrate as an axis is detected.

2. The vibrating type angular velocity sensor of claim 1 wherein, said driving vibrator element is fixed on said substrate by way of two sets of anchor portions arranged at positions symmetrical to each other with respect to said detecting vibrator element.

3. The vibrating type angular velocity sensor of claim 1, wherein, one of said detection electrodes is disposed within a hollow of said detecting vibrator element and is separated from said detecting vibrator element, and the other of said detection electrodes is disposed at an intermediate position between said driving vibrator element and said detecting vibrator element.

* * * * *